United States Patent Office 3,216,627
Patented Nov. 9, 1965

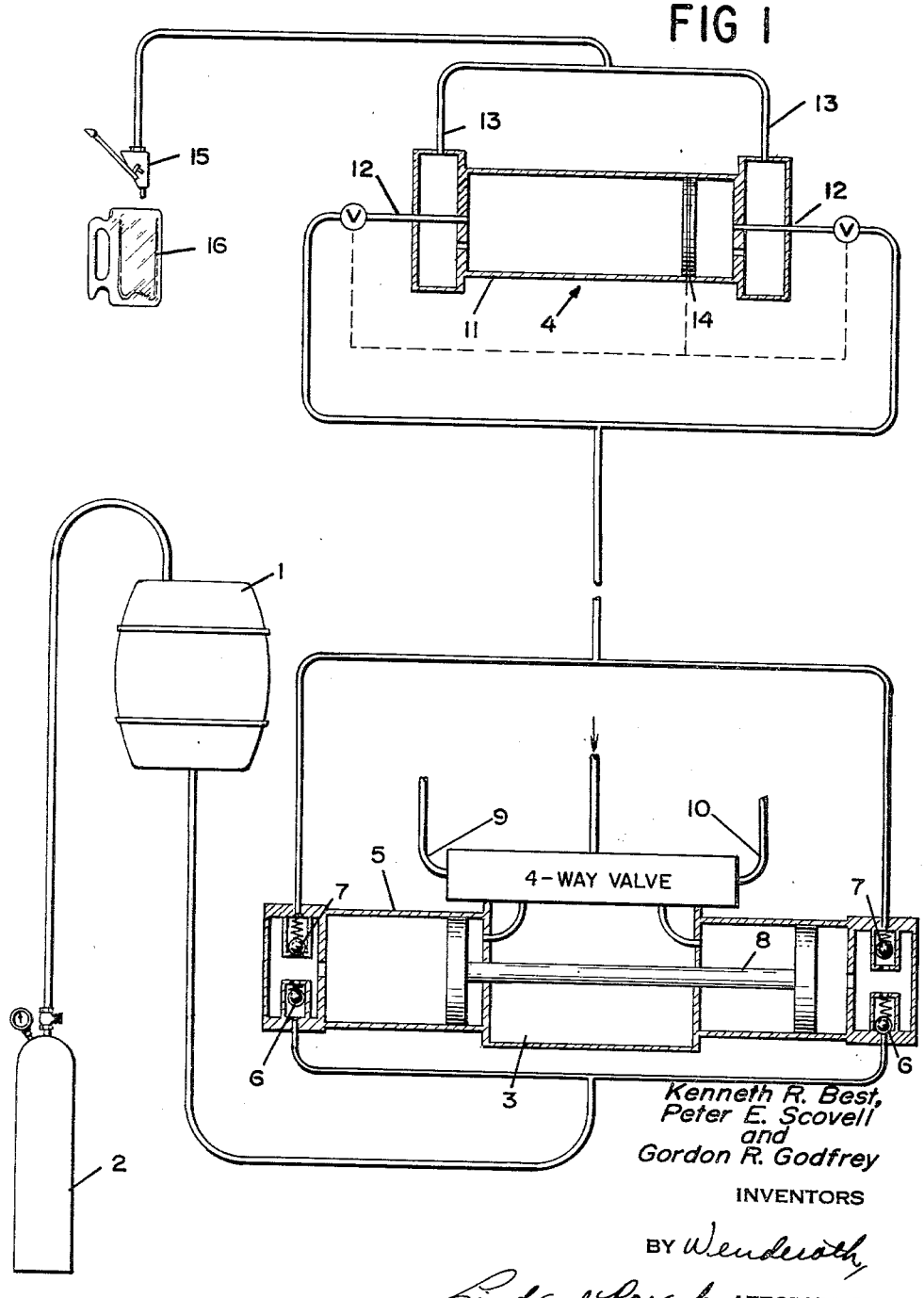

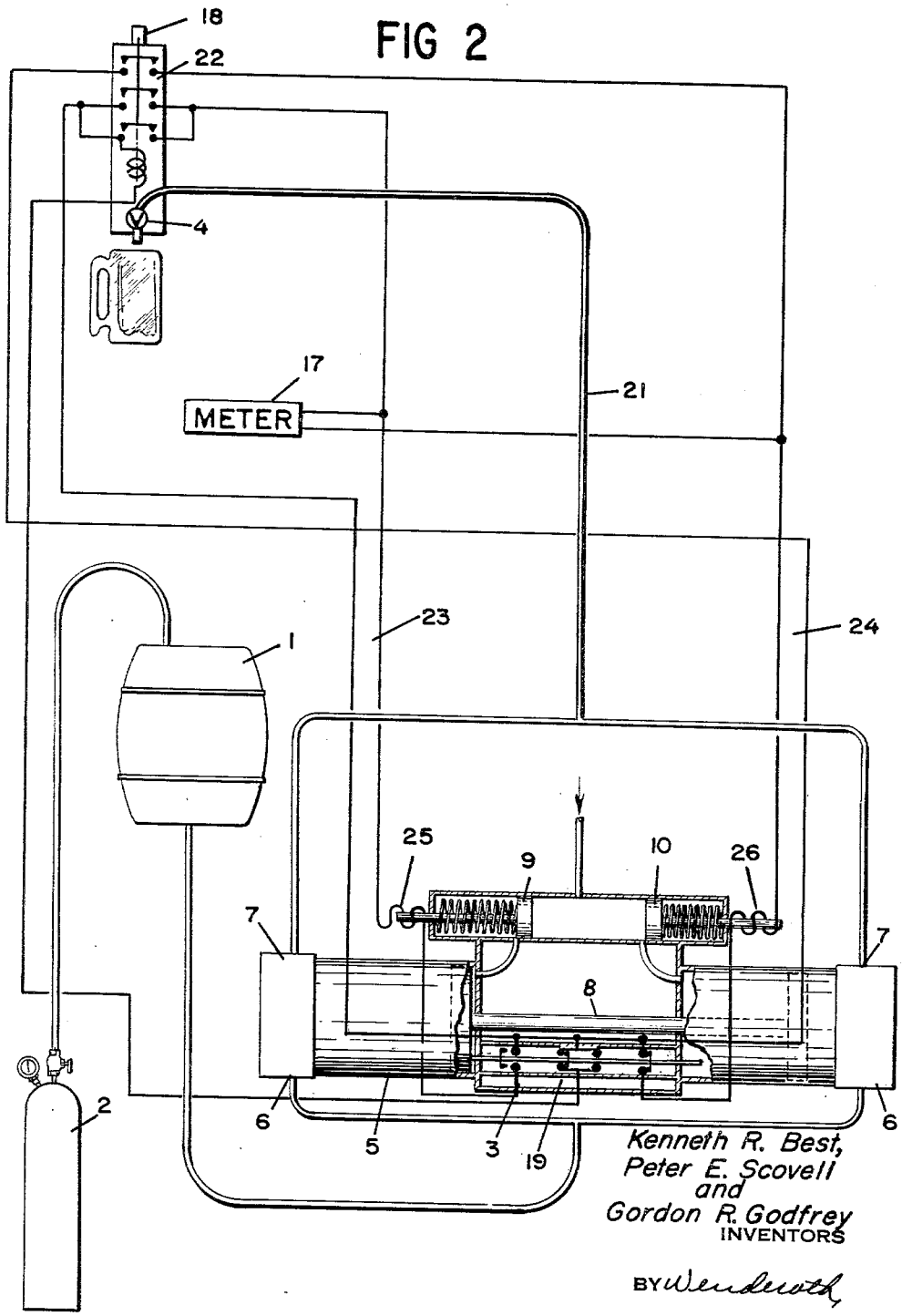

3,216,627
BEER DISPENSING APPARATUS
Kenneth Roy Best, Merstham, Surrey, Peter Eric Scovell, South Croydon, Surrey, and Gordon Reginald Godfrey, Carshalton, Surrey, England, assignors to The Distillers Company Limited, Edinburgh, Scotland, a British company
Filed July 6, 1964, Ser. No. 380,350
Claims priority, application Great Britain, July 5, 1963, 26,663/63
5 Claims. (Cl. 222—249)

This invention relates to an apparatus for dispensing pressurised drinking fluids.

By a pressurised drinking fluid is meant a drinking fluid which is subjected to a gas under pressure before it is dispensed. The preferred gas is carbon dioxide. Pressurised beer is a common example of a pressurised drinking fluid.

Known apparatus for dispensing pressurised beer comprises a container for the beer, which is usually a metal drum or keg connected to a cylinder containing carbon dioxide under pressure, so that the beer can be pressurised by the carbon dioxide, together with pipes joining the container with a dispensing device in such a manner that the beer is forced from the container to the dispensing device under pressure from the carbon dioxide. If the pressure of carbon dioxide applied to the beer is much in excess of 5 pounds per square inch at room temperature an undesirable amount of foam is formed on dispensing, both within the apparatus and in the dispensed beer. This results in wastage of beer and difficulty in delivering the correct measure. This undesirable effect is particularly marked where the container and the dispensing device are at different levels as, for example, when the container is stored in the cellar, because the pressure of carbon dioxide required to raise the beer is often in the order of 10 pounds per square inch.

It is an object of the present invention to provide an improved apparatus in which the undesirable effects hereinbefore described are either eliminated or minimised.

Accordingly the present invention is an apparatus for dispensing a pressurised drinking fluid of the type in which a container for the pressurised drinking fluid is situated below the level of a dispensing device, said apparatus comprising a pump placed below any level which the drinking fluid can attain in the container, said pump being capable of pumping the pressurised drinking fluid from the container to the dispensing device, and means are provided to prevent a foam-forming drop of pressure in the drinking fluid within the apparatus during dispensing.

Although it is preferred to use a gas operated pump, other types of pumps including electric pumps are satisfactory.

The dispensing device is preferably metering means consisting essentially of a measuring cylinder and a piston such as the device hereafter described with reference to FIGURE 1. A single tap or valve can also be used.

It is preferred that the pump should be turned on and off automatically when the dispensing device is operated. Where a gas operated pump is used its operation can be automatically controlled in response to variation in the pressure of drinking fluid between the pump and the dispensing device caused by operation of the apparatus. Alternatively it can be controlled by independent electrical or pneumatic means which operate in response to the opening and closing of the dispensing device when drinking fluid is being dispensed.

It is an essential feature of the apparatus of this invention that the pressure on the drinking fluid throughout the apparatus is prevented from dropping to such an extent that foaming occurs within the apparatus during dispensing. The pump which is placed below any level which the drinking fluid can attain in the container in operation increases the pressure of the drinking fluid between the pump and the dispensing device and provided that the outflow of drinking fluid from the dispensing device is controlled in conjunction with the pumping capacity of the pump a foam-forming drop of pressure between the pump and the delivery device can be prevented.

When the dispensing device contains metering means of the type comprising a measuring cylinder and piston, a drop of pressure in the apparatus can be prevented by ensuring that there is sufficient friction between the piston and the cylinder wall of the metering device. The friction prevents rapid movement of the piston and thus prevents a foam-forming drop of pressure within the apparatus during the dispensing.

When the dispensing device consists of a simple tap or valve, a drop of pressure can be prevented by adjusting the bore size of the pipe between the pump and the tap or the valve. The frictional forces to which the fluid is subjected when passing through this pipe, prevent too rapid an outflow of drinking fluid which might otherwise cause a foam-forming drop of pressure. Alternatively, the orifice of the dispensing device can be designed with a suitable restriction in order to achieve the same result. These alternative means can be used in conjunction with each other.

The present invention is now described with reference to the accompanying drawing in which FIGURE 1 illustrates an apparatus for dispensing pressurised beer consisting of a container comprising a beer keg 1 connected via a reduction valve to a cylinder 2 containing carbon dioxide under pressure. The keg is also connected to the inlet side of a gas operated pump 3 situated below the keg. The outlet side of the pump is connected to a beer dispensing device 4. The pump 3 is conventional and consists of two cylinders 5 each having an inlet valve 6 and outlet valve 7. The cylinders contain a double headed piston 8 which is operated by gas supplied under constant pressure through ports 9 and 10 of a conventional four-way valve operated either directly by the piston or through an intermediate piston operated air valve. The dispensing device 4 consists of a cylinder 11 having an inlet 12 and outlet 13 at each end. The cylinder contains a slideable piston head 14. The outlets 13 of the device are connected to a delivery valve 15 through which the beer is finally passed into the glass 16.

In operation of the apparatus a top pressure of about 5 pounds per square inch of carbon dioxide gas is applied to the beer in the container. The relative levels of the container and the pump maintain this top pressure in the beer between the container and the inlet sides of the pump 3. When delivery valve 15 of the dispensing device is opened the gas operated pump functions automatically in response to a drop in pressure in the outlet side of the pump. The beer under pressure enters the cylinder of the pump on the inlet stroke and is forced out of the pump under pressure from the gas operated piston. The gas pressure which operates the pump is about 20 pounds per square inch. The beer enters one of the inlets 12 of dispensing device 4 and the pressure moves the slideable piston head 14 across the cylinder until it is full. The friction between the piston head and cylinder ensures that a sufficient pressure is maintained on the beer to prevent it foaming in the cylinder. A measured quantity of beer is then metered from the device through the valve 15. The pump automatically ceases to function when valve 15 is closed.

FIGURE 2 illustrates a modification of the apparatus shown in FIGURE 1 in which the dispensing device is a single delivery valve 4 which is connected to the output sides of the gas operated pump 3 through the branched pipe 11. Suitable adjustment of the size of the orifice or restriction device in delivery valve 4 and the bore size of pipe 11 provide frictional forces which ensure that a sufficient pressure is maintained on the beer to prevent it from foaming in this part of the apparatus when the beer is dispensed. Delivery valve 4 is also connected to electrical switch mechanisms 12 and 19. These switch mechanisms control an electric circuit (13, 14) serving solenoids 15 and 16 which actuate the pump operating valves 9 and 10. Switch mechanism 12 is controlled by a push button 18. The electric circuit (13, 14) is also connected to a counter 17 which records the number of pumping strokes and thus the quantity of beer delivered. The remainder of the apparatus is the same as that described with reference to FIGURE 1. The operation of the apparatus is also similar to that described with reference to FIGURE 1 but differing in that opening of delivery valve 4 by manipulation of push button 18 of the dispensing device operates electric switch mechanism 12 to energise solenoids 15 or 16 which actuate pump operating valves 9 or 10. This causes the pump to force beer through pipe 11 and out of the apparatus through the dispensing device. When the pumping stroke is complete the switch mechanism 19 is operated. This de-energises solenoids 15 or 16 closing valves 9 or 10 and also operates switch mechanism 12 which closes the delivery valve 4 returning push button 18 to its original position.

The apparatus described with reference to FIGURE 2 can be modified by replacing the means for electrically controlling the operation of pump 3 with a pneumatic control means connecting the dispensing device with the pump.

The pump 3 in FIGURES 1 and 2 can be modified by replacing the pumping pistons with flexible diaphragms.

We claim:

1. Apparatus for dispensing a pressurised drinking fluid of the type in which a container for the pressurised drinking fluid is situated below the level of a dispensing device, said apparatus comprising a pump placed below any level which the fluid can attain in the container, and a dispensing device connected to said pump, said pump being capable of pumping the pressurised fluid from the container to the dispensing device, and means forming part of said dispensing device to prevent a foam-forming drop of pressure in the drinking fluid within the apparatus during dispensing.

2. An apparatus as claimed in claim 1 wherein said means forming part of the dispensing device comprises a measuring cylinder and a piston in which the friction between the piston and cylinder wall is sufficient to prevent the drop of pressure.

3. An apparatus as claimed in claim 1 wherein the dispensing device comprises a tap or valve and said means forming part of said dispensing device comprises a portion of said tap or valve having a restriction in its orifice sufficient to prevent the drop of pressure.

4. An apparatus for dispensing pressurized beer of the type comprising a beer keg capable of being pressurized with carbon dioxide gas from a carbon dioxide gas cylinder in which the keg is situated below the level of the dispensing device, said apparatus comprising a pump placed below any level which the beer can attain in the keg, a dispensing device connected to said pump, said pump being capable of pumping the beer from the keg to the dispensing device, and said dispensing device provided with means to prevent a foam forming drop of pressure in the beer within the apparatus during dispensing.

5. An apparatus for dispensing a pressurized drinking fluid, comprising a dispensing device, a container for the pressurized drinking fluid situated below the level of the dispensing device, a pump connected between said container and said dispensing device and placed below any level which the fluid can attain in the container, said pump being capable of pumping the pressurized fluid from the container to the dispensing device, said dispensing device provided with means to prevent a foam forming drop of pressure in the drinking fluid within the apparatus during dispensing.

References Cited by the Examiner

UNITED STATES PATENTS 2,187,793  1/40  Rice _____ 222—464 X

FOREIGN PATENTS 671,948  12/29  France.
945,469  5/49  France.
116,024  12/00  Germany.

LOUIS J. DEMBO, *Primary Examiner.*

HADD S. LANE, *Examiner.*